(12) United States Patent
Ostrow

(10) Patent No.: US 9,903,751 B1
(45) Date of Patent: Feb. 27, 2018

(54) FOOD PORTION WEIGHT SCALE

(71) Applicant: Robert Ostrow, Holliston, MA (US)

(72) Inventor: Robert Ostrow, Holliston, MA (US)

( * ) Notice: Subject to any disclaimer, the term of this patent is extended or adjusted under 35 U.S.C. 154(b) by 151 days.

(21) Appl. No.: 15/064,125

(22) Filed: Mar. 8, 2016

(51) Int. Cl.
G01G 21/22 (2006.01)
G01G 21/28 (2006.01)
G01G 19/414 (2006.01)

(52) U.S. Cl.
CPC ............ G01G 19/414 (2013.01); G01G 21/22 (2013.01); G01G 21/28 (2013.01)

(58) Field of Classification Search
CPC ........ G01G 19/414; G01G 21/22; G01G 21/28
USPC .......................................................... 177/200
See application file for complete search history.

(56) References Cited

U.S. PATENT DOCUMENTS

| 497,614 | A | * | 5/1893 | Tavenner | G01G 19/50 |
| | | | | | 177/245 |
| 3,938,602 | A | | 2/1976 | Sly | |
| D274,894 | S | | 7/1984 | Houlihan | |
| 4,868,951 | A | * | 9/1989 | Akesson | A22C 25/12 |
| | | | | | 177/145 |
| 4,912,972 | A | * | 4/1990 | Gregersen | B65H 61/00 |
| | | | | | 177/200 |
| 5,139,100 | A | * | 8/1992 | Brauneis | A47F 9/048 |
| | | | | | 177/245 |
| 6,433,288 | B1 | * | 8/2002 | Olafsson | G01G 11/046 |
| | | | | | 177/145 |
| 8,134,090 | B2 | * | 3/2012 | Duppre | G01G 11/043 |
| | | | | | 177/119 |
| 2008/0257612 | A1 | * | 10/2008 | Raymond | G01G 21/22 |
| | | | | | 177/253 |
| 2009/0149980 | A1 | | 6/2009 | Blaine | |

FOREIGN PATENT DOCUMENTS

WO 2013078329 A1 5/2013

* cited by examiner

*Primary Examiner* — Randy Gibson
(74) *Attorney, Agent, or Firm* — Kyle A. Fletcher, Esq.

(57) ABSTRACT

The food portion scale is a device that allows for the measurement of individual portions of foodstuffs before a foodstuff is physically portioned. The foodstuff is a scale wherein the platter of the scale is mounted on a fulcrum. The foodstuff is then placed on the food portion scale such that the fulcrum passes underneath the foodstuff dividing the foodstuff into two portions. The food portion scale independently measures the weight of each portion of the food stuff as it is divided by the line of the fulcrum. The foodstuff is then scored along the line of the fulcrum. When the foodstuff is later cut into portions along the score line, the foodstuff will be portioned into portions that match the previously measured weights. The food portion scale comprises a platter, a fulcrum, a plurality of load cells, a plurality of displays, a housing, and a control system.

18 Claims, 4 Drawing Sheets

FOOD PORTION WEIGHT SCALE

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of instruments for measuring weights and mass, more specifically, an instrument for measuring items of a special form or property.

SUMMARY OF INVENTION

The food portion scale is a device that allows for the measurement of individual portions of a foodstuff before the foodstuff is physically portioned. Specifically, the foodstuff is a scale wherein the platter of the scale is mounted on a fulcrum. The foodstuff is then placed on the food portion scale such that the fulcrum passes underneath the foodstuff dividing the foodstuff into two portions. The food portion scale independently measures the weight of each portion of the food stuff as it is divided by the line of the fulcrum. The foodstuff is then scored along the line of the fulcrum. When the foodstuff is later cut into portions along the score line, the foodstuff will be portioned into portions that match the previously measured weights within commercially acceptable tolerances.

These together with additional objects, features and advantages of the food portion scale will be readily apparent to those of ordinary skill in the art upon reading the following detailed description of the presently preferred, but nonetheless illustrative, embodiments when taken in conjunction with the accompanying drawings.

In this respect, before explaining the current embodiments of the food portion scale in detail, it is to be understood that the food portion scale is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the food portion scale.

It is therefore important that the claims be regarded as including such equivalent construction insofar as they do not depart from the spirit and scope of the food portion scale. It employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

Figure 1:
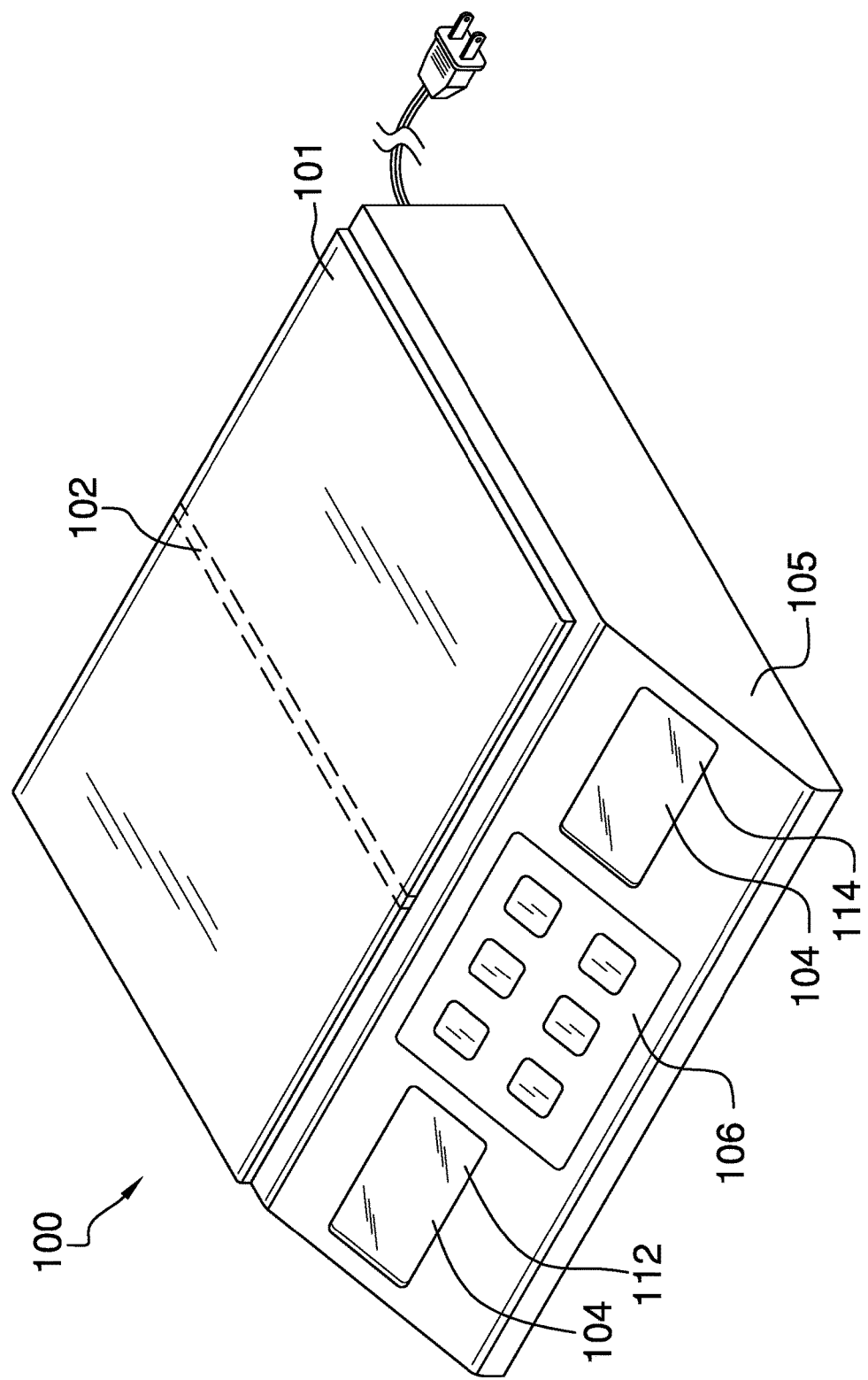
FIG. 1 is a perspective view of an embodiment of the disclosure.
Figure 2:
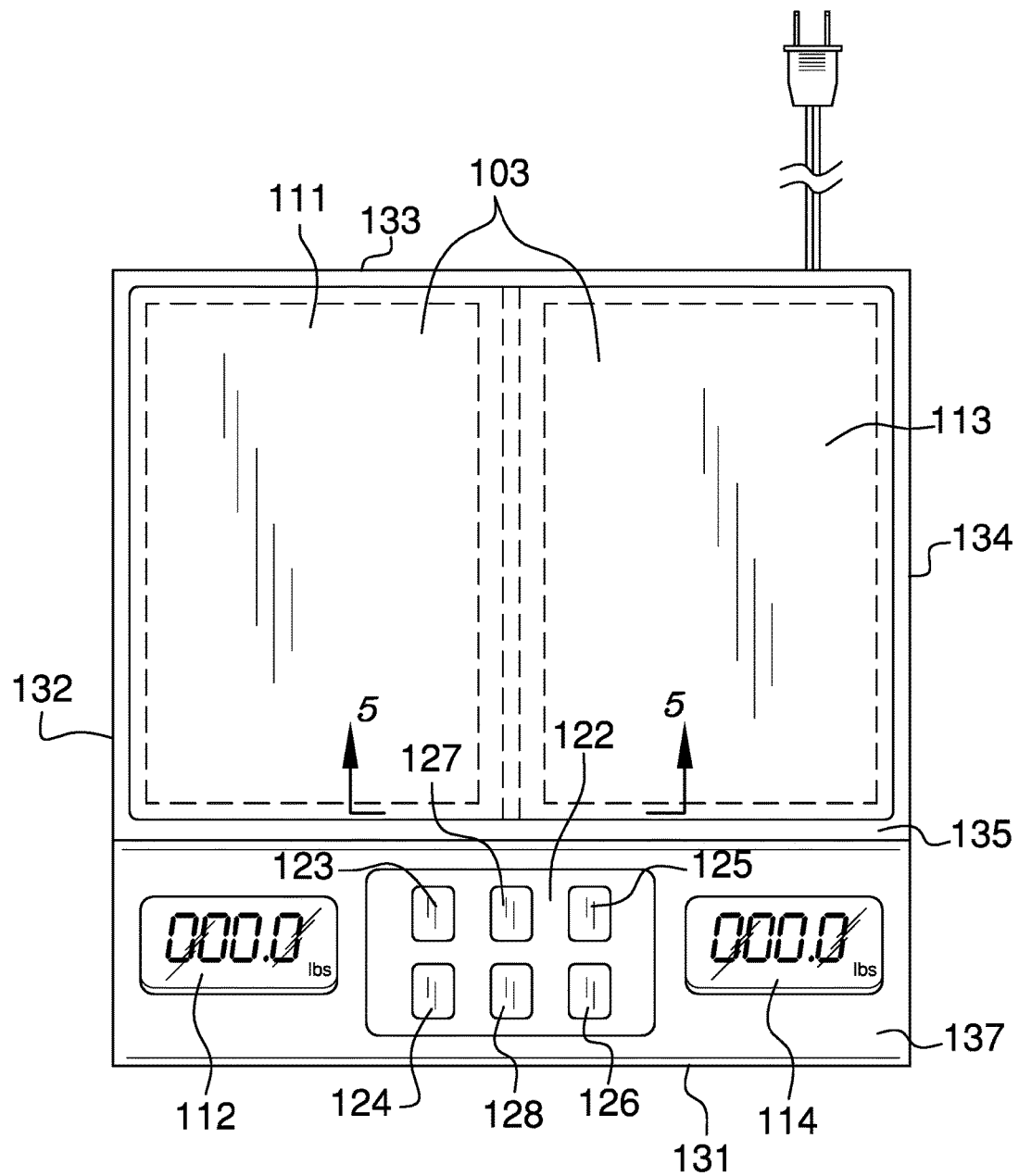
FIG. 2 is a top view of an embodiment of the disclosure.

The following detailed description is merely exemplary in nature and is not intended to limit the described embodiments of herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to a first potential embodiment of the disclosure, which is illustrated in FIGS. 1 through 5.

The food portion scale 100 (hereinafter invention) comprises a platter 101, a fulcrum 102, a plurality of load cells 103, a plurality of displays 104, a housing 105, and a control system 106.

The invention 100 is a device that allows for the measurement of individual portions of a foodstuff 151 before the foodstuff 151 is physically portioned. Specifically, the invention 100 is a scale wherein the platter 101 of the scale is mounted on a fulcrum 102. The foodstuff 151 is then placed on the invention 100 such that the fulcrum 102 passes underneath the foodstuff 151 dividing the foodstuff 151 into a plurality of individual portions. The invention 100 independently measures the weight of each portion of the food stuff as it is divided by the line of the fulcrum 102. The foodstuff 151 is then scored along the line of the fulcrum 102. When the foodstuff 151 is later cut into portions along the score line 152, the foodstuff 151 will be portioned into portions that match the previously measured weights within commercially acceptable tolerances.

The housing 105 is a rigid casing upon which and in which the balance of the invention 100 is mounted. The housing 105 is shaped in the form of a rectangular block with a bevel 137. The housing 105 is further defined with a top surface 135, a bottom surface 136, a first edge 131, a second edge 132, a third edge 133, and a fourth edge 134. The bevel 137 is on the first edge 131. The bottom surface 136 is the surface of the housing 105 that is placed upon the resting surface 153 when the invention 100 is used normally. The top surface 135 is the surface of the housing 105 that is distal from the bottom surface 136. When the top surface 135 is directly viewed, the remaining edges in clockwise order are the first edge 131, the second edge 132, the third edge 133, and the fourth edge 134.

Figure 5:
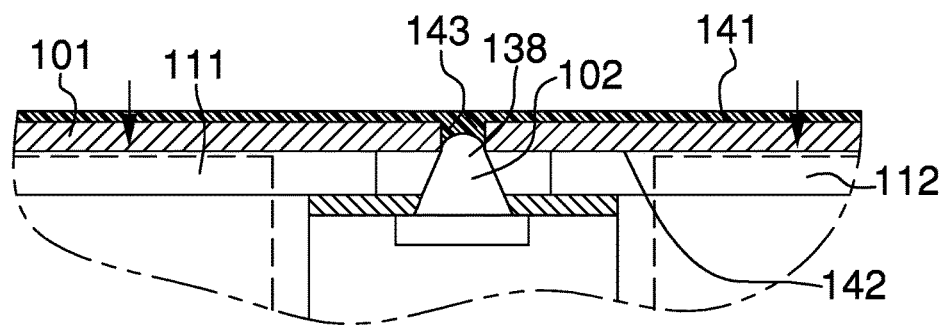
FIG. 5 is a cross-sectional view of an embodiment of the disclosure across 5-5 as shown on FIG. 2.
Figure 6:
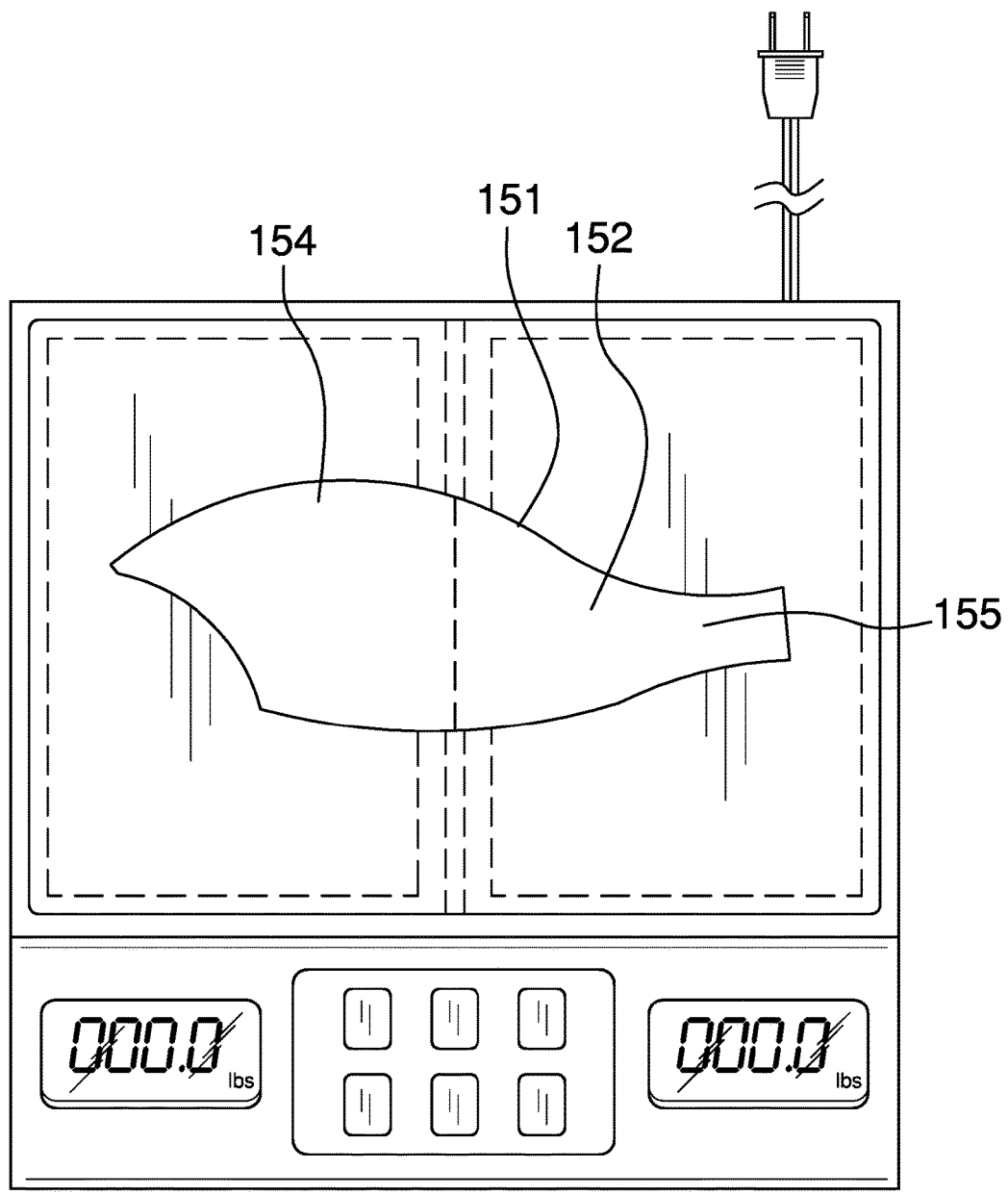
FIG. 6 is an in use view of an embodiment of the disclosure.

Mounted on the top surface 135 of the housing 105 is the fulcrum 102 and the plurality of load cells 103. Each of the gauge load cell that is selected to be appropriate for weighing objects. The fulcrum 102 is a shaft with a triangular cross-section and a rounded vertex 138. As shown most clearly in FIG. 2, the fulcrum 102 is mounted on the top surface 135 such that the fulcrum 102 is positioned on the center of the top surface 135 such that the direction of the fulcrum 102 is perpendicular to the first edge 131 and the third edge 133. As shown most clearly in FIG. 5, the rounded vertex 138 of the fulcrum 102 projects away from the top surface 135 such in a direction away from the bottom surface 136. Each of the plurality of load cells 103 are mounted on the top surface 135 of the housing 105 such that the fulcrum 102 separates at least one load cell selected from the plurality of load cells 103 from the balance of load cells remaining in the plurality of load cells 103. As shown in FIG. 5, span of the projection of fulcrum 102 is such that the rounded vertex 138 extends beyond each of plurality of load cells 103.

Figure 3:
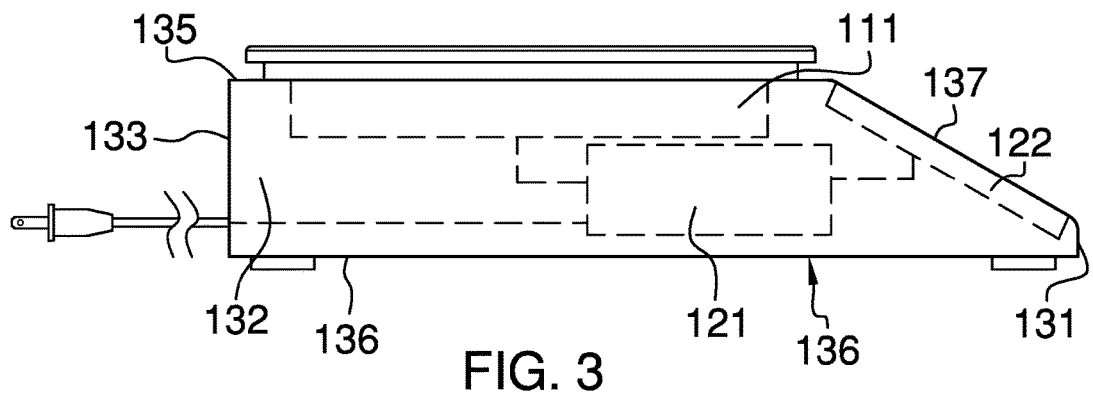
FIG. 3 is a side view of an embodiment of the disclosure.
Figure 4:
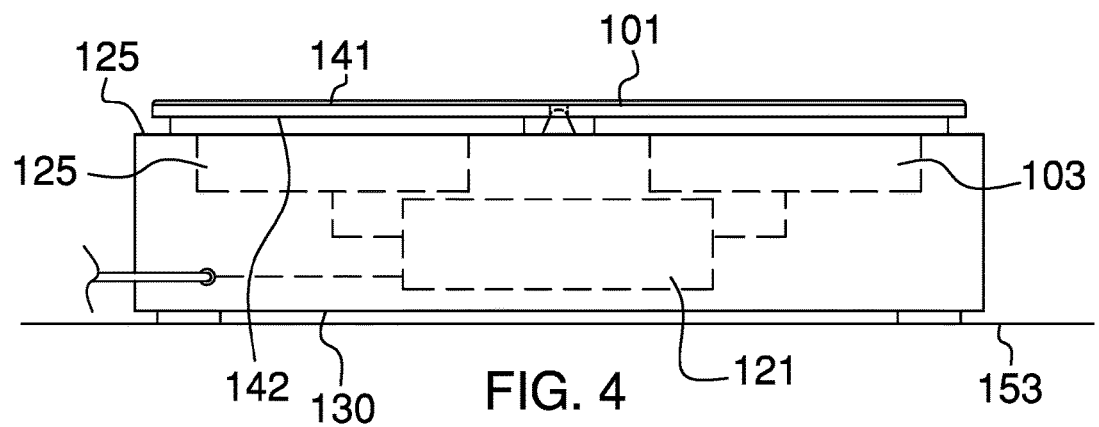
FIG. 4 is a rear view of an embodiment of the disclosure.

As shown most clearly in FIGS. 1 and 3, the platter 101 is a plate upon which the foodstuff 151 is placed when the invention 100 is in use. The platter 101 is made of a flexible material that will deform slightly when subjected to a force. The platter 101 is further defined with an exposed surface 141 and a contact surface 142. The exposed surface 141 is the 151 in normal usage. The contact surface 142 is the surface of the platter 101 that is distal from the exposed surface 141 and that is in "contact" with the housing 105. The platter 101 further comprises a notch 143. The notch 143 is a rounded groove that is formed in the contact surface 142. The notch 143 is sized such it receives the fulcrum 102 during normal usage of the invention 100. As shown most clearly in FIG. 5, the platter 101 is mounted on the fulcrum 102 such that the fulcrum 102 is positioned within the notch 143 and, when nothing is resting on the platter 101 then the platter 101 is in contact with each of the plurality of load cells 103.

The theory of operation of the invention 100 is described in this paragraph. The notch 143 of the platter 101 is positioned such that it divides the platter 101 into two equal regions. Therefore, the load cells selected from the plurality of load cells 103 on each side of the fulcrum 102 will: 1) only measure the weight of the platter 101 on its side of the fulcrum 102; and, 2) the weight measured by the subplurality of load cells on each side of the fulcrum 102 will measure the same weight. For the purpose of simplicity and clarity, this paragraph will assume going forward that the weight of the platter 101 will be "tared" out. When a foodstuff 151, or other object, is placed on the exposed surface 141 of the platter 101 serves as a temporary dividing line that divides the foodstuff 151 into a first portion 154 and a second portion 155; and 2) the rounded vertex 138 of the fulcrum 102 becomes the pivot point of a lever (formed by the platter 101) such that the weight of the first portion 154 is measured by the subplurality of load cells located on a selected side of the fulcrum 102 while the weight of the second portion 155 is measured by the subplurality of load cells located on the opposite side of the fulcrum 102. The foodstuff 151 is then scored to create a score line 152 along the line of the fulcrum 102. The foodstuff 151 is then cut along the score line 152 to create the first portion 154 and the second portion 155. Upon completion of this procedure, the measured weight of the first portion 154 will equal within commercially acceptable tolerances the measured weight of the first portion 154 before portioning. Furthermore, the measured weight of the second portion 155 will equal within commercially acceptable tolerances the measured weight of the second portion 155 before portioning.

The purpose of the control system 106 is to monitor the plurality of load cells 103, convert the electrical signals generated by the each of the plurality of load cells 103 into a visual display that is displayed on each of the plurality of displays 104. Each of the plurality of displays 104 is and commercially available LED or LCD display that is controlled by the control system 106. The number of displays contained within the plurality of displays 104 is equal to or greater than the number of load cells contained within the plurality of load cells 103.

The control system 106 further comprises a logic module 121 and a control panel 122. The control panel 122 further comprises a first tare switch 123, a first cumulative switch 124, a second tare switch 125, a second cumulative switch 126, a combine switch 127, and a unit switch 128. The control panel 122 and each of the plurality of displays 104 are mounted on the bevel 137.

The logic module 121 is a programmable device that is used to control and operate the device. The purpose of the logic module 121 is to monitor the each of the plurality of load cells 103, covert the electrical signals received from each of the plurality of load cells 103 into a meaningful display that is displayed on the a display selected from the plurality of displays 104. The logic module 121 receives signals from the control panel 122 to determine the operational logic the logic module 121 will use to process and display signals received from each of the plurality of load cells 103.

The above paragraph can be made clearer with a description disclosure. This description is exemplary in nature and should not necessarily be construed as preferred or advantageous over other implementations. This example is provided for the purposes of simplicity and for clarity of exposition of the disclosure and is not intended to limit the scope of the appended claims but is instead provided to enable persons skilled in the art to practice the disclosure.

In the first potential embodiment of the disclosure, the plurality of load cells 103 further comprises a first load cell 111 and a second load cell 113. The plurality of displays 104 further comprises a first display 112 and a second display 114. The first display 112 is associated with the first load cell 111 in the sense that electrical signals from the first load cell 111 that are processed by the logic module 121 are displayed on the first display 112. Similarly, the second display 114 is associated with the second load cell 113 in the sense that electrical signals from the second load cell 113 that are processed by the logic module 121 are displayed on the second display 114. The logic module 121 monitors the control panel 122 and adjusts the logical operations performed by the logic module 121 based on inputs received from the control panel 122. These logical adjustments are described in the following paragraphs.

The combine switch 127 is a switch that instructs the logic module 121 to add the weights for the first load cell 111 and the second load cell 113 together and to display the resulting sum on both the first display 112 and the second display 114.

The unit switch 128 is a switch that adjusts the logic module 121 to adjust its calculations to change the measurement units the measured weights are being displayed in. In the first potential embodiment of the disclosure, the unit switch 128 changes the unit of measure between grams and pounds.

The first tare switch 123 is a tare button that instructs the logic module 121 to subtract the weight currently on the first load cell 111 from future displays.

The second tare switch 125 is a tare button that instructs the logic module 121 to subtract the weight currently on the second load cell 113 from future displays.

The first cumulative switch 124 is a switch that adjusts the logic module 121 to activate a memory function such that the logic module 121 keeps track of prior weight measurements on the first load cell 111 and displays the cumulative weight of several items that are measured on the first display 112. In this mode, the first tare switch 123 is used to indicate when weighed foodstuffs 151 are being changed.

The second cumulative switch 126 is a switch that adjusts the logic module 121 to activate a memory function such that the logic module 121 keeps track of prior weight measurements on the second load cell 113 and displays the cumulative weight of several items that are measured on the second display 114. In this mode, the second tare switch 125 is used to indicate when weighed foodstuffs 151 are being changed.

The following definitions were used in this disclosure:

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; or, 4) the point, pivot, or axis around which something revolves.

Cross-section: As used in this disclosure, a cross-section is a surface or shape that would be exposed by making a straight cut through an object.

Load Cell: As used in this disclosure, a load cell is a transducer that measures an applied force and generates an electrical signal that is a known function of the applied force.

Logic Module: As used in this disclosure, a logic module is a programmable device that accepts digital and analog inputs, processes the digital and analog inputs according to previously stored instruction and to provide the results of these instructions as digital or analog outputs.

Pivot: As used in this disclosure, a pivot is a rod or shaft around which an object rotates or swings.

Tare: As used in this disclosure, tare means to deduct a current or existing weight measurement being displayed on an instrument from the display of future weight measurements made on the instrument. As one of many examples of this is practice, scales are often tared to deduct the weight of packaging included in gross weight from the net weight of a sold product.

Transducer: As used in this disclosure, a transducer is a device that converts a physical quantity, such as pressure or brightness into an electrical signal or a device that converts an With respect to the above description, it is to be realized that the optimum dimensional relationship for the various components of the invention described above and in FIGS. 1 through 6, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A scale comprising:
a platter, a fulcrum, a plurality of load cells, a plurality of displays, a housing, and a control system;
wherein the scale measures weight of a plurality of individual portions of a foodstuff before the foodstuff is physically portioned;
wherein the fulcrum passes underneath the foodstuff;
wherein the fulcrum divides the foodstuff into the plurality of individual portions;
wherein the scale measures the weight of each of the plurality of individual portions separately;
wherein the housing is a rigid casing upon which and in which the balance of the scale is mounted;
wherein the housing is further defined with a top surface, a bottom surface, a first edge, a second edge, a third edge, and a fourth edge;
the fulcrum is a shaft with a triangular cross-section and a rounded vertex.

2. The scale according to claim 1
wherein the fulcrum and the plurality of load cells are mounted on the top surface;
wherein the fulcrum is positioned on the center of the top surface;
wherein each of the plurality of load cells are mounted on the top surface of the housing such that the fulcrum separates at least one load cell selected from the plurality of load cells from the balance of load cells remaining in the plurality of load cells.

3. The scale according to claim 2
wherein the fulcrum is mounted on the top surface such that the rounded vertex of the fulcrum projects away from the top surface such in a direction away from the bottom surface;
wherein the span of the projection of fulcrum is such that the rounded vertex extends beyond each of plurality of load cells.

4. The scale according to claim 3
wherein the platter is a plate made of a flexible material that will deform when subjected to a force;
wherein the platter is further defined with an exposed surface and a contact surface.

5. The scale according to claim 4 wherein the platter further comprises a notch.

6. The scale according to claim 5
wherein the notch is a groove that is formed in the contact surface;
wherein the notch is sized such it receives the fulcrum during normal usage of the scale;
wherein the platter is mounted on the fulcrum such that the fulcrum is positioned within the notch.

7. The scale according to claim 6
wherein the control system monitors the plurality of load cells;
wherein the control system converts electrical signals generated by the each of the plurality of load cells into a visual display;
wherein the visual display is displayed on each of the plurality of displays.

8. The scale according to claim 7 wherein the number of displays contained within the plurality of displays is equal to or greater than the number of load cells contained within the plurality of load cells.

9. The scale according to claim 8 wherein the control system further comprises a logic module and a control panel.

10. The scale according to claim 9
wherein the logic module is a programmable device;
wherein the logic module adjusts the operation of the scale in response to inputs from the control panel.

11. The scale according to claim 10
wherein the plurality of load cells further comprises a first load cell and a second load cell;
wherein the plurality of displays further comprises a first display and a second display.

12. The scale according to claim 11
wherein the control panel further comprises a combine switch;
wherein the combine switch signals the logic module to add the weight on the first load cell and the weight on the second load cell together and to display the resulting sum on both the first display and the second display.

13. The scale according to claim 12
wherein the control panel further comprises a unit switch;
wherein the unit switch signals the logic module to adjust its calculations to change the measurement units the measured weights are being displayed in.

14. The scale according to claim 13 wherein the unit switch changes the unit of measure between the metric units and US Customary Units.

15. The scale according to claim 13
wherein the control panel further comprises a first tare switch;
wherein the first tare switch signals the logic module to subtract the weight currently on the first load cell from future displays on the first display.

16. The scale according to claim 15
wherein the control panel further comprises a second tare switch;
wherein the second tare switch signals the logic module to subtract the weight currently on the second load cell from future displays on second first display.

17. The scale according to claim 16
wherein the control panel further comprises a first cumulative switch;
wherein the first cumulative switch signals the logic module to activate a memory function such that the logic module keeps track of prior weight measurements on the first load cell and displays the cumulative weight of several items that are measured sequentially on the first display.

18. The scale according to claim 17
wherein the control panel further comprises a second cumulative switch;
wherein the second cumulative switch signals the logic module to activate a memory function such that the logic module keeps track of prior weight measurements on the second load cell and displays the cumulative weight of several items that are measured sequentially on the second display.

\* \* \* \* \*